United States Patent
Sturm et al.

(10) Patent No.: US 11,899,133 B2
(45) Date of Patent: Feb. 13, 2024

(54) METHOD FOR DETERMINING AT LEAST ONE OBJECT INFORMATION ITEM OF AT LEAST ONE TARGET OBJECT WHICH IS SENSED WITH A RADAR SYSTEM, IN PARTICULAR OF A VEHICLE, RADAR SYSTEM AND DRIVER ASSISTANCE SYSTEM

(71) Applicant: Valeo Schalter und Sensoren GmbH, Bietigheim-Bissingen (DE)

(72) Inventors: Christian Sturm, Bietigheim-Bissingen (DE); Hamid Afrasiabi Vayghan, Bietigheim-Bissingen (DE); Yoke Leen Sit, Bietigheim-Bissingen (DE); Gang Li, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 538 days.

(21) Appl. No.: 17/258,003

(22) PCT Filed: Jun. 7, 2019

(86) PCT No.: PCT/EP2019/065001
§ 371 (c)(1),
(2) Date: Jan. 5, 2021

(87) PCT Pub. No.: WO2020/007573
PCT Pub. Date: Jan. 9, 2020

(65) Prior Publication Data
US 2021/0278501 A1    Sep. 9, 2021

(30) Foreign Application Priority Data
Jul. 6, 2018    (DE) ..................... 10 2018 116 378.9

(51) Int. Cl.
*G01S 7/41* (2006.01)
*G01S 7/35* (2006.01)
(Continued)

(52) U.S. Cl.
CPC ................ *G01S 7/415* (2013.01); *G01S 7/03* (2013.01); *G01S 7/356* (2021.05); *G01S 13/584* (2013.01); *G01S 13/931* (2013.01)

(58) Field of Classification Search
CPC .. G01S 13/931; G01S 13/4463; G01S 13/584; G01S 13/003; G01S 7/354;
(Continued)

(56) References Cited

U.S. PATENT DOCUMENTS 5,465,095 A * 11/1995 Bryant ................ G01S 13/5244
342/162
6,433,730 B1 * 8/2002 Borla .................... G01S 7/2922
342/197
(Continued)

FOREIGN PATENT DOCUMENTS

DE    102008061932 A1    7/2010
DE    102004006519 B4    5/2017
(Continued)

OTHER PUBLICATIONS

International Search Report with Written Opinion in corresponding International Application No. PCT/EP2019/065001, dated Sep. 13, 2019 (15 pages).
(Continued)

*Primary Examiner* — Vladimir Magloire
*Assistant Examiner* — Michael W Justice
(74) *Attorney, Agent, or Firm* — Osha Bergman Watanabe & Burton LLP (57) ABSTRACT

A method for determining at least one object information item of at least one target object (18) which is sensed with
(Continued)

a radar system (12) of a vehicle (10), a radar system (12) and a driver assistance system (12) are described. Transmission signals (32*a*, 32*b*, 32*c*) are transmitted into a monitoring range (14) of the radar system (12) with three transmitters (Tx1, Tx2, Tx3). Echoes, which are reflected at the at least one target object (18), of the transmission signals (32*a*, 32*b*, 32*c*) are received as received signals (34*a*, 34*b*, 32*c*) with at least two receivers (RxA, RxB, RxC, RxD). The received signals (34*a*, 34*b*, 34*c*) are subjected to at least one multi-dimensional discrete Fourier transformation. At least one target signal is determined from the result of the Fourier transformation. An object information item is determined from the target signal.

15 Claims, 6 Drawing Sheets

(51) Int. Cl.
*G01S 7/03* (2006.01)
*G01S 13/58* (2006.01)
*G01S 13/931* (2020.01)

(58) Field of Classification Search
CPC .. G01S 7/356; G01S 7/415; G01S 2013/0263; G01S 2013/0245
USPC ................................. 342/109, 25 B, 99, 160
See application file for complete search history.

(56) References Cited

U.S. PATENT DOCUMENTS

| | | | | |
|---|---|---|---|---|
| 7,714,782 | B2* | 5/2010 | Davis | H01Q 21/22 342/99 |
| 9,103,910 | B2* | 8/2015 | Holder | G01S 13/06 |
| 9,182,476 | B2 | 11/2015 | Wintermantel | |
| 9,529,078 | B2* | 12/2016 | Holder | G01S 7/2927 |
| 9,696,417 | B2* | 7/2017 | Hayakawa | G01S 13/424 |
| 9,791,551 | B1* | 10/2017 | Eshraghi | G01S 7/0232 |
| 9,989,627 | B2* | 6/2018 | Eshraghi | G01S 13/931 |
| 10,141,657 | B2* | 11/2018 | Kishigami | G01S 13/26 |
| 10,145,936 | B2* | 12/2018 | Kishigami | G01S 7/282 |
| 10,527,718 | B2* | 1/2020 | Matsumoto | G01S 13/343 |
| 10,634,775 | B2* | 4/2020 | Loesch | G01S 13/003 |
| 10,768,291 | B2* | 9/2020 | Hammes | G01S 13/343 |
| 11,204,647 | B2* | 12/2021 | Rao | G01S 7/41 |
| 11,675,070 | B2* | 6/2023 | Spielmann | G01S 13/89 343/702 |
| 2005/0195103 | A1* | 9/2005 | Davis | H01Q 21/22 342/158 |
| 2007/0285315 | A1* | 12/2007 | Davis | H01Q 21/22 342/377 |
| 2008/0042895 | A1 | 2/2008 | Inaba | |
| 2011/0080314 | A1* | 4/2011 | Wintermantel | H01Q 9/0407 342/147 |
| 2015/0109165 | A1* | 4/2015 | Holder | G01S 7/2922 342/159 |
| 2015/0260836 | A1* | 9/2015 | Hayakawa | H01Q 13/206 342/368 |
| 2016/0033623 | A1* | 2/2016 | Holder | G01S 7/0234 342/93 |
| 2016/0282450 | A1* | 9/2016 | Kishigami | G01S 13/426 |
| 2016/0285172 | A1* | 9/2016 | Kishigami | G01S 7/023 |
| 2017/0082744 | A1* | 3/2017 | Matsumoto | G01S 7/352 |
| 2017/0254879 | A1 | 9/2017 | Tokieda, I et al. | |
| 2017/0307729 | A1* | 10/2017 | Eshraghi | G01S 7/2813 |
| 2017/0307744 | A1* | 10/2017 | Loesch | G01S 13/931 |
| 2018/0031675 | A1* | 2/2018 | Eshraghi | G01S 13/347 |
| 2018/0120427 | A1* | 5/2018 | Cornic | G01S 13/343 |
| 2018/0329027 | A1* | 11/2018 | Eshraghi | G01S 7/038 |
| 2019/0087009 | A1* | 3/2019 | Rao | G01S 7/352 |
| 2019/0107617 | A1* | 4/2019 | Crowley | H01Q 11/105 |
| 2019/0209134 | A1* | 7/2019 | Kang | A61B 8/488 |
| 2019/0346544 | A1* | 11/2019 | Hammes | G01S 13/931 |
| 2021/0135373 | A1* | 5/2021 | Spielmann | H01Q 13/10 |
| 2021/0181334 | A1* | 6/2021 | Crowley | G01S 13/87 |

FOREIGN PATENT DOCUMENTS

| | | | |
|---|---|---|---|
| DE | 102017101763 | A1 | 8/2018 |
| DE | 102017129149 | A1 | 6/2019 |
| EP | 2417475 | B1 | 8/2013 |

OTHER PUBLICATIONS

German Search Report in corresponding German Application No. 10 2018 116 378.9, dated Mar. 27, 2019 (8 pages).

Sturm, Christian et al.: "Automotive Fast-Chirp MIMO Radar with Simultaneous Transmission in a Doppler-Multiplex". In: 19th International Radar Symposium (IRS), Jun. 20-22, 2018, Bonn Germany, 6 S.—ISBN 978-3-7369-9545-1 (6 pages).

\* cited by examiner

METHOD FOR DETERMINING AT LEAST ONE OBJECT INFORMATION ITEM OF AT LEAST ONE TARGET OBJECT WHICH IS SENSED WITH A RADAR SYSTEM, IN PARTICULAR OF A VEHICLE, RADAR SYSTEM AND DRIVER ASSISTANCE SYSTEM

TECHNICAL FIELD

The invention relates to a method for determining at least one object information item of at least one target object which is sensed with a radar system, in particular of a vehicle, in which
- transmission signals are transmitted into a monitoring range of the radar system with at least three transmitters,
- echoes, which are reflected at the at least one target object, of the transmission signals are received as received signals with at least two receivers, and if necessary are converted into a form which can be used by an electronic control and/or evaluation device,
- the received signals are subjected to at least one discrete Fourier transformation,
- at least one target signal is determined from the result of the at least one Fourier transformation.
- at least one object information item is determined from the at least one target signal.

In addition, the invention relates to a radar system, in particular of a vehicle for determining at least one object information item of at least one target object,
- having at least three transmitters for transmitting transmission signals into a monitoring range,
- having at least two receivers for receiving echoes, which are reflected at the at least one target object, of the transmission signals as received signals, and
- having at least one control and/or evaluation device,
- wherein the at least one control and/or evaluation device has means for determining at least one target signal from at least one discrete Fourier transformation of the received signals and for determining at least one object information item from at least one target signal.

Furthermore, the invention relates to a driver assistance system of a vehicle, having
- at least one electronic control device for controlling functional devices of the vehicle on the basis of object information which is made available by at least one radar system, and
- at least one radar system for determining at least one object information item of at least one target object, wherein the at least one radar system has
- at least three transmitters for transmitting transmission signals into a monitoring range,
- at least two receivers for receiving echoes, which are reflected at the at least one target object, of the transmission signals as received signals and
- at least one control and/or evaluation device,
- wherein the at least one control and/or evaluation device has means for determining at least one target signal from at least one discrete Fourier transformation of the received signals and for determining at least one object information item from at least one target signal.

PRIOR ART

Document DE 10 2004 006 519 B4 discloses a method for arranging a multiplicity of transmission antennas and a multiplicity of reception antennas for a radar device which is equipped with a multiplicity of channels. Each of the multiplicity of channels is composed of a combination of one of the multiplicity of transmission antennas and one of the multiplicity of reception antennas. The radar device serves to determine a direction of a target by transmitting an electrical wave to the target and receiving, over each of the multiplicity of channels, the electrical wave reflected by the target. The radar device has a signal processor for outputting a modulation instruction to a D/A converter and for executing the signal processing with respect to the sampled data of a superimposition signal which is picked up by an A/D converter, in order to determine the distance and the relative speed to a target which reflects the radar waves, and the direction of the position in which the target is present. The signal processor is mainly composed of a known microcomputer, which has a CPU, a ROM and a RAM, and has an operational processing device (for example a DSP) for executing processing of a fast Fourier transformation or FFT with respect to data which has been received by the A/D converter.

The invention is based on the object of configuring a method, a radar system and a driver assistance system of the type mentioned at the beginning in which object information, in particular the distance, speed and/or direction of the at least one object relative to the radar system can be determined more simply and/or more reliably.

DISCLOSURE OF THE INVENTION

This object is achieved with the method according to the invention in that
- at the transmitter end, at least one first transmission signal, at least one second transmission signal and at least one third transmission signal are generated from a frequency-modulated continuous wave signal, wherein the at least one second transmission signal and the at least one third transmission signal are encoded by means of phase modulations with respect to the at least one first transmission signal, with the result that at least temporary signal orthogonality is brought about between the transmission signals,
- the at least one first transmission signal is transmitted with at least one first transmitter, the at least one second transmission signal is transmitted with at least one second transmitter, and the at least one third transmission signal is transmitted with at least one third transmitter simultaneously into the monitoring range of the radar system, wherein the at least one second transmission signal is emitted with regular transmission pauses of a predefined length.
- the received signals are subjected to at least one multidimensional discrete Fourier transformation, According to the invention, the at least one first transmission signal, the at least one second transmission signal and the at least one third transmission signal are not continuously emitted simultaneously. In the case of the at least one second transmission signal, regular transmission pauses of a predefined length are inserted. Furthermore, the at least one first transmission signal, the at least one second transmission signal and at least one third transmission signal are emitted in different phase positions. Overall, the ambiguities in the results of the at least one discrete Fourier transformation are therefore reduced. The target signals of at least one target object can therefore be assigned more easily to the transmission signals and validated. Overall, the accuracy in the determination of the object information can therefore be improved.

The at least one first transmitter, the at least one second transmitter and the at least one third transmitter are active at the same time. In this way, the determination of the object information can be speeded up.

The reflected echoes are received at the transmission end as received signals and, if necessary, are converted into a form which can be used by an electronic control and/or evaluation device. If the transmission signals and the resulting echoes have a type of signal which cannot be processed directly with the corresponding electronic control and/or evaluation device, the received signals are converted into an electronically usable form. Otherwise, there is no need for corresponding adaptation, in particular conversion, of the received signals. In this way, the received signals can be processed by means of the electronic control and/or evaluation device either directly or, if appropriate, after corresponding adaptation.

The method can advantageously be implemented with at least one means using software and/or hardware solutions. The method can be implemented by means of software and/or hardware solutions in combination with the control and/or evaluation device. The means for executing the method can be contained in a control and/or evaluation device of the radar system which is required in any case.

The radar system can advantageously use fast frequency modulation for implementing the transmission signals. In this context, a plurality of what are referred to as chirps with corresponding frequency ramps as chirps sequences are emitted in succession.

The at least one second transmission signal and the at least one third transmission signal are encoded by means of phase modulations with respect to one another and with respect to the at least one first transmission signal in such a way that at least temporary signal orthogonality is brought about between the transmission signals. In this way, differentiation of the transmission signals at the receiver end can be simplified.

At the output of the Fourier transformation, the target signals which originate from the individual transmission signals are shifted in the Doppler dimension in accordance with the phase difference which is added from one chirp to the next. By using the method according to the invention, the individual signal components can be more easily assigned to the at least one first transmission signal, the at least one second transmission signal and the at least one third transmission signal, and phase position of the individual propagation paths can be determined independently of one another.

The radar system can be what is referred to as a MiMo radar which has a plurality of transmission and reception antennas. In this context, the transmission antennas can be active simultaneously and the transmission signals can be suitably encoded, in particular orthogonally, so that the receiver or receivers can track back the propagation paths to all the active transmitters independently of one another. As a result it is possible to use the resulting phase shifts of all the transmitter and receiver combinations to carry out azimuth angle measurement particularly accurately or also to measure the azimuth and elevation simultaneously on a phase basis.

As a result of the inventive use of three transmitters, which are used simultaneously, the radar system according to the invention is particularly effective. Ambiguities which occur here can be resolved through the method steps according to the invention on the basis of the antenna geometry, in particular the spatial arrangement of the transmitters and receivers.

In one advantageous embodiment of the method, the at least one third transmitter and at the least one second transmitter can be arranged along a virtual transmitter line, wherein the transmitter line runs transversely with respect to the main transmission directions of the transmitters. In this way, a defined arrangement of the transmitters is obtained.

In the normal orientation of the radar system, the virtual transmitter line can advantageously run in a spatially horizontal fashion. In this way, the corresponding arrangement of the transmitters can permit azimuth angles to be determined for the at least one target object.

In a further advantageous embodiment of the method, the at least one third transmitter can be arranged at a first distance from the at least one second transmitter, wherein the first distance can be specified as an integral multiple, in particular multiplication by three, of half the wavelength of the at least one first transmission signal. In this way, when a virtual array is generated on the basis of the specific spatial arrangement of the transmitters, a double-assigned virtual element can be generated, in particular using geometric folding or projection. Information from the double-assigned virtual element can be used to resolve ambiguities in the received signals.

In a further advantageous embodiment of the method, the at least one first transmitter can be arranged on the virtual transmitter line. In this way, the accuracy of a determination of the azimuth angle can be improved. Alternatively, the at least one first transmitter can be arranged next to the virtual transmitter line. In this way, an elevation for the at least one target object can be additionally determined.

In a further advantageous embodiment of the method, the at least one first transmitter and the at least one second transmitter are arranged, considered in a projection onto the transmitter line, at different distances from the at least one third transmitter. In this way, any ambiguities in the transmission signals can be resolved even better.

In a further advantageous embodiment of the method, the at least two receivers can be arranged on a virtual receiver line, wherein the receiver line can run transversely with respect to the main reception directions of the receivers, and wherein the adjacent receivers are each arranged at a third distance from one another which can correspond to half the wavelength of the at least one first transmission signal. In this way, when a virtual array is generated on the basis of the specific spatial arrangement of the transmitters, a double-assigned virtual element can be made possible. Information from the double-assigned virtual element can be used to resolve ambiguities in the received signals.

In one advantageous embodiment, a multiplicity of target signals can be respectively determined in combination for all the receivers and individually for each receiver at the receiver end from the result of the at least one multi-dimensional discrete Fourier transformation. For each physically present target object, one of the target signals can correspond to the at least one first transmission signal, two target signals can correspond to the at least one second transmission signal, and one of the target signals can correspond to the at least one third transmission signal. Since the intensity of the at least one second transmission signal is divided into two transmission signals—insofar as there are at least three transmission signals are emitted with the same intensities—the absolute values of the complex-valued amplitudes of the target signals from the at least one second transmission signal are lower than the absolute values of the complex-valued amplitudes of the target signal from the first transmission signal and of the target signal from the third transmission signal. In this way, the two target signals from the at least one second transmission signal can be differentiated from the target signal from the at least one first transmission signal and the target signal from the at least one third transmission signal.

In a further advantageous embodiment, the result of the at least one multi-dimensional Fourier transformation can be respectively implemented in combination for all the receivers and individually for each receiver as a range Doppler matrix for a uniqueness range with respect to a Doppler dimension. In this context, the range Doppler matrix can be composed of cells which can each be characterized by a Doppler value and a range value and can have a complex-valued amplitude which can characterize a signal intensity. The range Doppler matrix can be divided into four sub-matrices with the same extent with respect to the Doppler dimension. For each range value, the absolute values of the amplitudes of the cells of the sub-matrices, which each correspond in priority with respect to their Doppler value, are combined to form a respective spectrum value. From the spectrum values, those values can be determined which are above a predefined threshold and are detected as target spectrum values which are associated with a respective target signal.

The dimension of a cell in the range Doppler matrix in the distance dimension is referred to as a range gate. The dimension of a cell in the Doppler dimension is referred to as a Doppler gate. Each range gate is characterized by a range value and each Doppler gate is characterized by a Doppler value. Therefore, each cell in the range Doppler matrix is characterized by a range value and a Doppler value.

The number of sub-matrices can be advantageously calculated from the quotient of the number of Doppler gates of the uniqueness range and the smallest Doppler interval between target signals originating from the at least one first transmission signal, the at least one second transmission signal, and the at least one third transmission signal, of the same target object. In the case of a uniqueness range of, in particular, 128 Doppler gates and a smallest Doppler interval of, in particular, 32 Doppler gates, the range Doppler matrix can be divided into four sub-matrices, each with an extent of 32 Doppler gates. The uniqueness range can also comprise more or fewer than 128 Doppler gates. The smallest Doppler intervals between the target signals can be predefined by corresponding selection of the phase modulation and/or of the transmission pauses at the transmitter end.

In a further advantageous embodiment, for the at least one target spectrum value composed of a combination of all the receivers a difference can be formed between the complex-valued amplitudes of the cells which are associated with this target spectrum value and which have the lowest Doppler value and the third-lowest Doppler value, and the absolute value of this difference can be squared and assigned to a first comparison value. A difference between the complex-valued amplitudes of the cells which are associated with this target spectrum value and have the second-lowest Doppler value and the highest Doppler value is formed, and the absolute value of this difference can be squared and assigned to a second comparison value. The first comparison value and the second comparison value can be compared and the signals which are associated with the cells from whose amplitudes the lower of the two comparison values is formed can be validated as the two target signals which originate from the at least one second transmission signal, for the same target object.

For each range value the absolute values of the amplitudes of the cells of the sub-matrices which each correspond in priority with respect to their Doppler value are combined to form a respective spectrum value. In particular, in total, four absolute values—one absolute value for each of the sub-matrices—which are equal in priority with respect to their Doppler value, are added. For example, the cells are equal in priority with respect to their Doppler value and have the lowest Doppler value in their respective sub matrix. Correspondingly, the cells which have the second lowest Doppler value in their respective sub-matrix are equal in priority.

In order to determine the spectrum values, the absolute values of the complex-valued amplitudes of the respective cells can be advantageously added and the result squared. Alternatively, the absolute values of the complex-valued amplitudes can be squared (absolute value squares) and the absolute value squares of the complex-valued amplitudes can be added. In this way, by combining the corresponding cells of the sub-matrices, an overall amplitude of the cells which correspond to one another and have the same range value can be determined.

From the spectrum values, those which lie above a predefined noise threshold with respect to their power are determined. These spectrum values are detected as target spectrum values which are associated with a respective target signal. In this way, the actual target signals can be differentiated from noise and/or ghost signals. The cells of the range Doppler matrix which contain target signals can therefore be determined.

For at least one target spectrum value, a difference between the complex-valued amplitudes of the cells which are associated with this target spectrum value and which have the lowest Doppler value and the third-lowest Doppler value is formed, and the absolute value of this difference is squared and assigned to a first comparison value. In addition, a difference is formed between the complex-valued amplitudes of the cells which are associated with this target spectrum value and have the second-lowest Doppler value and the highest Doppler value, and the absolute value of this difference is squared and assigned to a first comparison value. The comparison values are compared. The signals which are associated with the cells from whose amplitudes the lower of the two comparison values is formed are validated as the two target signals which originate from the at least one second transmission signal, for the same target object. The cells which actually contain target signals can be identified more efficiently and quickly by means of the comparison of the third and fourth comparison values.

In a further advantageous embodiment of the method, geometric folding or geometric projection is carried out starting from a preceding spatial arrangement of the transmitters and of the receivers, and a virtual array is generated therefrom, and that element of the virtual array is identified as a double-assigned virtual element to which both at least one received signal of the at least one second transmission signal which is received by at least one of the receivers is applied, and at least one received signal of one of the two other respective at least one transmission signals which is received by at least one other of the receivers is applied.

A difference can be formed between the phase of one of the complex-valued amplitudes of that receiver which does not use the second transmission signal of the second transmitter to form the double-assigned virtual element, wherein this complex-valued amplitude corresponds in priority to one of the two amplitudes from which the higher of the first two comparison values is formed, in the combined consideration of the receivers, and the phase of one complex-valued amplitude or the mean value of the two complex-valued amplitudes, of that receiver or those receivers which leads or lead to the double-assigned virtual element in which the second transmitter is involved. The absolute value of this difference can be assigned to a third comparison value.

A difference can be formed between the phase of the other of the complex-valued amplitudes of that receiver which does not use the second transmission signal of the second transmitter to form the double-assigned virtual element, wherein this other complex-valued amplitude corresponds in priority to the other of the two amplitudes from which the higher of the first two comparison values is formed, in the combined consideration of the receivers, and the phase of one complex-valued amplitude or the mean value of the two complex-valued amplitudes, of that receiver or those receivers which leads or lead to the double-assigned virtual element in which the second transmitter is involved. The absolute value of this difference can be assigned to a fourth comparison value.

The third comparison value and the fourth comparison value can be compared. The signal which is associated with the cells from whose amplitudes the lower of the two comparison values is formed can be validated as the target signal which originates from the at least one third transmission signal, for the same target object. The signal which is associated with the cells from whose amplitudes the higher of the two comparison values is formed can be validated as the target signal which originates from the at least one first transmission signal, for the same target object.

Overall, the particular spatial arrangement of the transmitters and of the receivers makes it possible that, when there is geometric folding or geometric projection of the arrangement, a virtual array can be generated in which precisely one double-assigned virtual element is produced, to which two different individual virtual elements are applied. The double-assigned virtual element is therefore assigned to two different transmitters and two different receivers. The individual virtual elements which are involved in the double-assigned virtual element receive the same signal phase here, as a result of which, given knowledge of the one involved virtual element. the other involved element can be identified automatically. This information can be used to resolve the remaining ambiguity arising from the signal shape.

At least one object information item can be advantageously determined from at least one validated target signal. In this context, both the at least one first transmission signal and the at least one second transmission signal, and correspondingly the target signals, can be used to determine object information. In this way, different object information can be determined more directly and any ambiguities can be resolved more reliably.

At least one object information item in the form of a speed and/or a position, in particular an interval and/or a direction of the at least one object relative to the radar system can be advantageously determined from at least one validated target signal. In this way, the radar system can be used to acquire information about the at least one object, which information is interesting in particular to control driving functions of the vehicle.

The target objects which can be sensed with the radar system can be from stationary or moving objects, in particular other vehicles, persons, obstacles, uneven portions of the roadway, in particular potholes or stones, roadway boundaries or the like. A plurality of target objects can originate from different parts of the same object or different objects.

The invention can be used in a vehicle, in particular a motor vehicle. The invention can advantageously be used in a land-based vehicle, in particular a passenger vehicle, a lorry, a bus, a motorcycle or the like, an aircraft and/or a watercraft. The invention can also be used in autonomous, or at least partially autonomous, vehicles.

The radar system can advantageously be connected to a driver assistance system of the vehicle, in particular a parking assistance system, a chassis control system and/or a driver information device, or be part of such a system or device. In this way, the object information acquired with the radar system, in particular distances, directions and/or speeds of an object relative to the vehicle, can be transmitted to a controller of the driver assistance system and used to influence driving functions, in particular the speed, a braking function, a steering function and/or the outputting of a message signal and/or warning signal, in particular for the driver.

The target spectrum values can be advantageously determined from the spectrum values by means of at least one detection algorithm. In this way, signals which are associated with target spectrum values can be differentiated from signals which originate from noise or ghost signals. An algorithm for determining a constant false alarm rate (CFAR) can advantageously be used as a detection algorithm.

In a further advantageous refinement, the length of the transmission pauses of the at least one second transmission signal can be predefined as a chirp duration or integral multiple of the chirp duration of the at least one first transmission signal. In this way, the at least one second transmission signal can be divided into two target signals at the receiver end by means of the Fourier transformation. The interval between these two target signals in the Doppler dimension can correspond to half the number of the Doppler gates in the uniqueness range.

The at least one first transmission signal, the at least one second transmission signal and the at least one third transmission signal can each be advantageously emitted as a chirp with the same duration. The at least one second transmission signal can pause for the duration of one chirp at every second chirp.

In a further advantageous refinement of the method, a phase difference between at least two validated target signals can be determined and/or a digital beam forming algorithm can be carried out. An angle of incidence or directional angle can be determined as an object information item from the phase difference and/or the digital beam forming algorithm. The direction of the sensed target object relative to the radar system can therefore be determined.

In the course of the determination of at least one object information item, at least one multi-dimensional discrete Fourier transformation can be executed as a fast Fourier transformation in the course of the determination of at least one object information item. In this way, the at least one Fourier transmission can be calculated more quickly.

A single multi-dimensional, in particular two-dimensional, three-dimensional, four-dimensional or the like, discrete Fourier transformation can be advantageously executed. In this way, information from the at least one first transmission signal, from the at least one second transmission signal and from the at least one third transmission signal can be utilized with just a single, in particular fast, Fourier transformation. The method can therefore be executed more efficiently.

When there are more than two receivers, a higher-dimensional, in particular three-dimensional, Fourier transformation, can be carried out.

The at least one second transmission signal and the at least one third transmission signal can advantageously be respectively encoded at the transmitter end by means of binary shift keying. In this way, signal orthogonality can be brought about between the transmission signals. The binary shift keying is a digital modulation method known per se and is also referred to in specialist circles as "binary phase-shift keying" (BPSK).

The encoding of at least one transmission signal can be advantageously carried out in time with the frequency ramps of the chirp sequences. In this way, the linear frequency ramps which follow one another can optionally be emitted with different phase positions, in particular 0° or 180°. The phases can therefore be shift keyed in such a way that the transmission signals at the transmitters are orthogonal when considered over the entire sequence length.

A regularly alternating pattern can advantageously be applied to at least one transmission signal. In this way, the at least one transmission signal, in particular at least one second transmission signal and/or at least one third transmission signal, can be more easily differentiated from at least another transmission signal, in particular at least one first transmission signal, and separated at the receiver end. At least one transmission signal can advantageously be emitted in the form of chirps.

At least one transmission signal can advantageously be emitted with a constant phase, and at least one transmission signal can advantageously be emitted with an alternating phase. In this way, the transmission signals can be better differentiated from one another.

At least one first transmission signal can advantageously be emitted with a constant phase. At least one second transmission signal and at least one third transmission signal can each be emitted with an alternating phase. Alternatively, at least one first transmission signal can be emitted with an alternating phase, and at least one second/third transmission signal can be emitted with a constant phase.

The transmission signal which is emitted with a constant phase can serve, after corresponding evaluation at the receiver end, as a reference with respect to at least one object information item, without the phase shift having to be corrected. Therefore, a relative speed between the sensed target object and the radar system can be directly determined, in particular from this transmission signal.

In a further advantageous embodiment, a phase change between 0° and 180° can be applied to at least one transmission signal after each frequency ramp of the frequency-modulated continuous wave signal. In this way, a regularly alternating pattern can easily be applied to the at least one transmission signal. Alternatively, a phase change between 0° and 180° can be applied to at least one transmission signal after each frequency ramp and a subsequent signal pause. In this way, ambiguity can be avoided.

The method can advantageously be carried out repeatedly in succession, in particular cyclically, In this way, the monitoring range can be monitored over a relatively long time period. Additionally or alternatively, the results of the individual measuring cycles can be compared with one another and therefore validation of the target signals can be improved and ambiguities resolved better.

At least one target signal can be advantageously validated over a plurality of measuring cycles. Such a method can be referred to as "tracking". By observing changes in at least one object information item, in particular a distance of the target object, over a plurality of measuring cycles, it is possible to determine which object information item of a plurality of other object information items, in particular speeds which can be determined from determined target signals, are correct. In this context, it is possible to additionally make use of the fact that of two object information items, in particular two different speeds which are determined for a target signal, only one object information item, that is to say a speed, can be correct. Overall, ambiguities with respect to target signals and object information contained therein can therefore be resolved more reliably.

In addition, according to the invention, the technical objective that the at least one control and/or evaluation unit should have means for carrying out the inventive method is solved with the radar system.

The means for carrying out the inventive method can advantageously be implemented by means of software and/or hardware solutions.

In one advantageous embodiment, two of the transmitters are arranged at a distance from one another which corresponds to an integral multiple, in particular multiplication by three, of half the wavelength of one of the transmission signals. In this way, when a virtual array is generated on the basis of the specific spatial arrangement of the transmitters, a double-assigned virtual element can be made possible. Information from the double-assigned virtual element can be used to resolve ambiguities in the received signals.

Furthermore, according to the invention, the technical objective that the at least one control and/or evaluation unit should have means for carrying out the inventive method is solved with the driver assistance system.

Moreover, the features and advantages indicated in connection with the method according to the invention, the radar system according to the invention and the driver assistance system according to the invention and the respective advantageous configurations thereof apply here in a mutually corresponding manner and vice versa. The individual features and advantages can of course be combined with one another, wherein further advantageous effects can occur that go beyond the sum of the individual effects.

BRIEF DESCRIPTION OF THE DRAWINGS

Further advantages, features and details of the invention are apparent from the following description, in which exemplary embodiments of the invention will be explained in more detail with reference to the drawing. A person skilled in the art will also expediently consider individually the features which have been disclosed in the drawing, the description and the claims in combination and combine them to form further meaningful combinations. In the drawing:

In the figures, identical structural elements are provided with the same reference numerals.

EMBODIMENT(S) OF THE INVENTION

Figure 1:
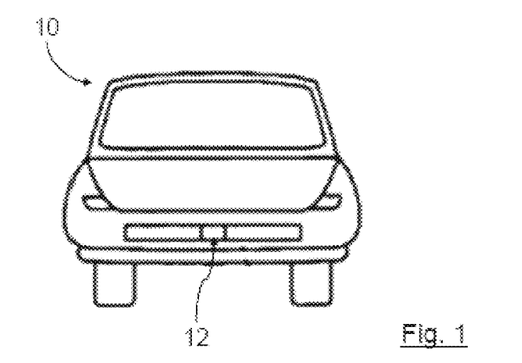
FIG. 1 shows a motor vehicle with a driver assistance system and a radar system for monitoring a monitoring range ahead of the motor vehicle in the direction of travel.
Figure 2:
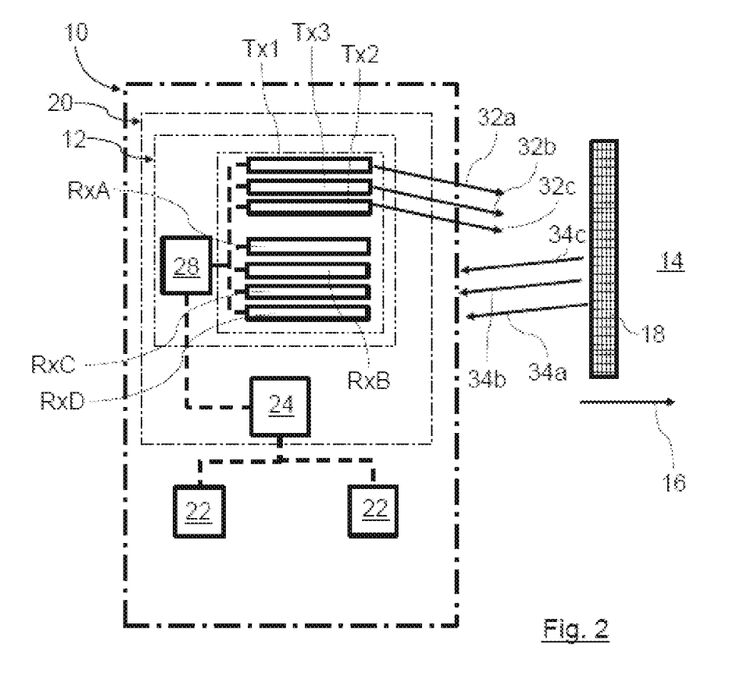
FIG. 2 shows a functional illustration of the motor vehicle with the driver assistance system and the radar system from FIG. 1.

FIG. 1 illustrates a motor vehicle 10 in the form of a passenger vehicle in front view. The motor vehicle 10 has a radar system 12. The radar system 12 is arranged, for example, in the front bumper of the motor vehicle 10. All components of the radar system 12, for example a plurality of transmitters and receivers, can be contained, for example, combined in a single radar sensor. The radar system 12 can be used to monitor a monitoring region 14 in the driving direction 16 in front of the motor vehicle 10 for objects 18. The radar system 12 can also be arranged and oriented differently at another location on the motor vehicle 10. The objects 18 can be, for example, other vehicles, persons, obstacles, uneven portions of the roadway, for example potholes or rocks, roadway boundaries or the like. In FIG. 2, an object 18 is indicated, for example, as a chequered rectangle. Otherwise, FIG. 2 is merely a function diagram of some of the components of the motor vehicle 10 and of the radar system 12, which diagram does not serve for spatial orientation.

The radar system 12 is configured as a frequency-modulated continuous wave radar. Frequency-modulated continuous wave radar systems are also referred to in specialist circles as FMCW (frequency modulated continuous wave) radar systems. The radar system 12 can be used, for example, to determine a distance, a direction and a speed of the object 18 relative to the motor vehicle 10.

The radar system 12 is part of a driver assistance system 20 or can at least be connected thereto. For example, the driver assistance system 20 can be used to support a driver of the motor vehicle 10. For example, the motor vehicle 10 can drive and park or exit parking spaces at least partially autonomously using the driver assistance system 20. The driver assistance system 20 can be used to influence driving functions of the motor vehicle 10, for example engine control, a braking function, or a steering function, or to output messages or warning signals. To this end, the driver assistance system 20 is connected in a regulating and/or controlling fashion to function devices 22. FIG. 2 illustrates by way of example two function devices 22. The function devices 22 can be, for example, an engine control system, a brake system, a steering system, a chassis control system or a signal output system.

The driver assistance system 20 includes an electronic control device 24, with which corresponding electronic control and regulation signals can be transmitted to the function devices 22 and/or can be received and processed thereby.

The radar system 12 comprises, for example, a first transmitter Tx1, a second transmitter Tx3, a third transmitter Tx3, an electronic control and evaluation device 28 and four receivers RxA, RxB, RxC and RxD. The transmitters Tx1, Tx2 and Tx3 are implemented, for example, with a radar sensor which contains, for example, a chip with the three integrated transmitters Tx1, Tx2 and Tx3. The transmitters Tx1, Tx2 and Tx3 are each connected to a separate transmission antenna.

Figure 4:
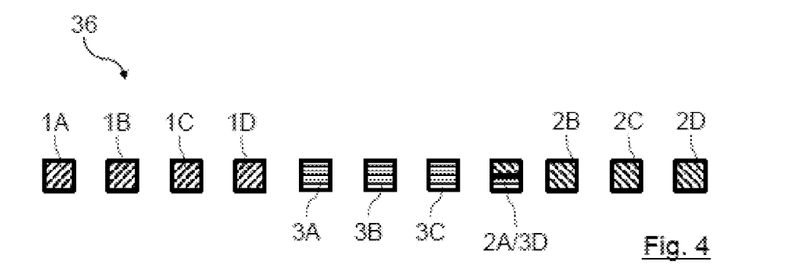
FIG. 4 shows a virtual array which arises from the arrangement of the transmitters and receivers of the radar system from FIG. 3 with geometric folding.

The spatial geometry of the antenna arrangement of the three transmitters Tx1, Tx2, and Tx3 and of the four receivers RxA, RxB, RxC and RxD is configured in such a way that, as explained in more detail below, two virtual elements 2A and 3D of a virtual array 36 are located at the same position, which is denoted below as a "double-assigned virtual element 2A/3D". For example, the virtual array 36 is formed, in a way which is not of further interest here, from the spatial geometry of the antenna arrangement by means of geometric folding or geometric projection.

Figure 3:
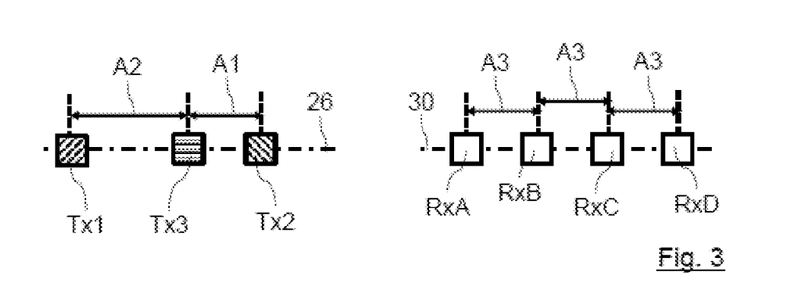
FIG. 3 shows a front view of the transmitters and receivers of the radar system from FIGS. 1 and 2 according to a first exemplary embodiment.

The three transmitters Tx1, Tx2, and Tx3, or their transmission antennas, are, as shown in FIG. 3, arranged along a virtual transmitter line 26. FIG. 3 shows the transmitters Tx1, Tx2, and Tx3 in the viewing direction onto the irradiation side of their transmission antennas. The transmitter line 26 runs transversely, for example perpendicularly, with respect to the main transmitter directions of the transmitters Tx1, Tx2, and Tx3. In FIG. 3, the main transmitter directions point perpendicularly away from the plane of the drawing. In the normal operating position of the radar system 12, in which for example the vehicle is stationary or moving on a horizontal roadway, the transmitter line 26 runs in a spatially horizontal fashion.

The third transmitter Tx3 is located, for example, spatially between the first transmitter Tx1 and the second transmitter Tx2. The third transmitter Tx3 is arranged at a first distance A1 from the second transmitter Tx2. The first distance A1 is three times half the wavelength of a first transmission signal 32a, which is emitted with the first transmitter Tx1. The first transmitter Tx1 is arranged at a second distance A2 from the third transmitter Tx3. The second distance A2 is different from the first distance A1. The second distance A2 is, for example, four times half the wavelength of the first transmission signal 32a. The distances A1 and A2 are therefore each an integral multiple of half the wavelength of the first transmission signal 32a.

The exemplary four receivers RxA, RxB, RxC and RxD, or their reception antennas, are, as also shown in FIG. 3, arranged one next to the other along a virtual reception line 30. FIG. 3 shows the receivers RxA, RxB, RxC and RxD with a viewing direction onto the reception side of their reception antennas. The reception line 30 runs transversely, for example perpendicularly, with respect to the main reception directions of the receivers RxA, RxB, RxC and RxD. In FIG. 3, the main transmitter directions point perpendicularly into the plane of the drawing. In the normal operating position of the radar system 12, in which for example the vehicle is stationary or moving on a horizontal roadway, the reception line 30 runs in a spatially horizontal fashion.

Receivers RxA, RxB, RxC and RxD which are adjacent to one another are each arranged at a distance A3 from one another. The second distance A3 corresponds, for example, to half the wavelength of the first transmission signal 32a.

For example, the straight line 26 and the reception line 30 run axially, as shown in FIG. 3. The first transmitter Tx1 can be located here on the side facing away from the receivers RxA, RxB, RxC and RxD. The receiver RxA can be located on the side facing the transmitters Tx1, Tx2 and Tx3, and the receiver RxD can be located on the side facing away from the transmitters Tx1, Tx2 and Tx3.

Starting from the specified spatial arrangement of the transmitters Tx1, Tx2 and Tx3 and of the receivers RxA, RxB, RxC and RxD, geometric folding or geometric projection is carried out and a virtual array 36 is generated therefrom, said array 36 being shown in FIG. 4. For the sake of better clarity, the elements of the virtual array 36 are each characterized in FIG. 4 with a number between 1 and 3 which denotes the involved transmitters Tx1, Tx2 and Tx3, and with a letter between A and D, which denotes the corresponding receivers RxA, RxB, RxC and RxD. Overall, 11 virtual elements are produced, denoted by 1A to 1D, 3A to 3D and 2A to 2D, wherein owing to the spatial arrangement of the transmitters Tx1, Tx2 and Tx3 and of the receivers RxA, RxB, RxC and RxD, two of the virtual elements, for example the virtual elements 2A and 3D are implemented in the same position as the double-assigned virtual element 2A/3D. For example, that element of the virtual array 36 to which both a received signal 34b of a second transmission signal 32b of the second transmitter Tx2, which is received for example by the receiver RxA, and for example a received signal 34c of a third transmission signal 32c of the third transmitter Tx3, which is received for example by the receiver RxD, is applied with the same phase position, is identified as a double-assigned virtual element 2A/3D.

The control and evaluation device 28 has a signal-transmitting connection to the control device 24. The control device 24 can be used to perform open-loop/closed-control of the driving functions of the motor vehicle 10 independently of object information of the radar system 12. Is not essential for the invention whether electrical/electronic control and/or evaluation devices, such as for example the control device 24, the control and evaluation device 28, an engine control device of the motor vehicle 10, or the like, are integrated into one or more components or assemblies or realized at least partially as decentralized components or assemblies.

The respective transmission antennas of the transmitters Tx1, Tx2 and Tx3 are, for example, of identical design. The transmitters Tx1, Tx2 and Tx3 can be used to transmit respective transmission signals 32a and 32c, in each case at a constantly changing frequency into the monitoring range 14. The transmission signals 32a, 32b and 32c are reflected at the object 18 and sent back as corresponding received signals 34a, 34b and 34c to the receivers RxA, RxB, RxC and RxD and received therewith. According to a further method described below, the distance, the direction and the speed of the object 18 relative to the motor vehicle 10 are determined from the received signals 34a, 34b and 34c with the control and evaluation device 28.

The method for determining object information of objects 18 which are sensed with the radar system 12 is explained by way of example below with reference to FIGS. 5 to 12.

In the method, the control and evaluation device 28 is used to actuate the transmitters Tx1, Tx2 and Tx3 in such a way that the first transmission signal 32a is transmitted with the first transmitter Tx1, the second transmission signal 32b is transmitted with the second transmitter Tx2 and the third transmission signal 32c is transmitted with the third transmitter Tx3, simultaneously into the monitoring range 14. The transmission signals 32a, 32b and 32c are generated from, for example, the same frequency-modulated continuous wave signal and are composed of a plurality of what are referred to as chirps, which occur successively. The second transmission signal 32b and the third transmission signal 32c are also encoded by means of phase modulations in the form of binary shift keying with respect to one another and with respect to the first transmission signal 32a, so that signal orthogonality is brought about between the transmission signals 32a, 32b and 32c.

Figure 5:
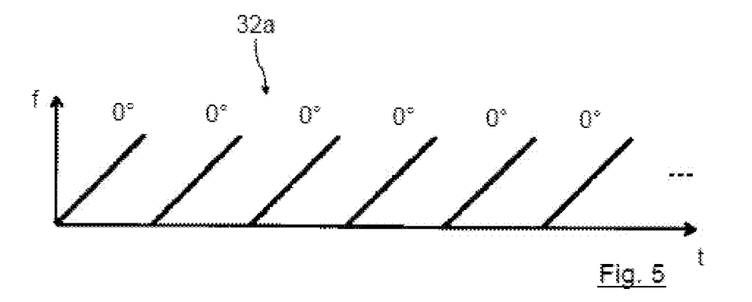
FIG. 5 shows a frequency/time diagram of a first transmission signal of a first transmitter of the radar system from FIGS. 1 to 3.

FIG. 5 shows a frequency/time diagram for the first transmission signal 32a. The frequency f is plotted on the ordinate axis and the time t on the abscissa axis. The chirps are shown here in each case as frequency ramps. The successive chirps of the first transmission signal 32a each have the same phase position, that is to say are each shifted by 0° in respect of their phase. The first transmission signal 32a is therefore emitted with a constant phase. Overall, 128 such chirps are emitted, for example, during a measurement. The number of chirps specifies a uniqueness range which is 128 here.

Figure 6:
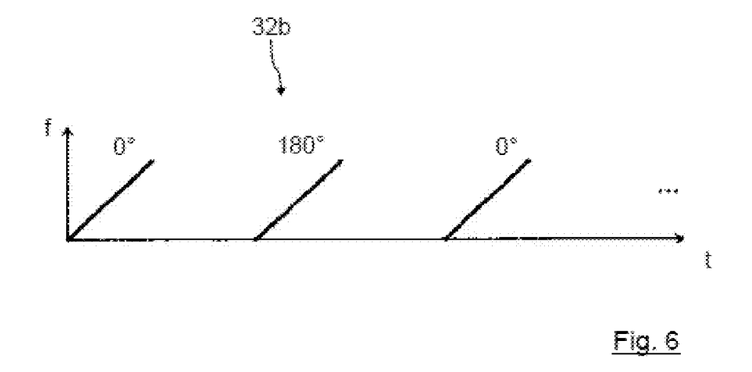
FIG. 6 shows a frequency/time diagram of a second transmission signal of a second transmitter of the radar system from FIGS. 1 to 3.

FIG. 6 shows a frequency/time diagram, comparable with FIG. 5, of the second transmission signal 32b. The second transmission signal 32b is emitted on the basis of successive chirps, in a way analogous to the first transmission signal 32a, but here with a transmission pause after each emitted chirp. The length of the transmission pause corresponds to the length of a chirp. Moreover, the successive chirps are implemented with a phase change, specifically between 0° and 180°, and therefore with a regularly alternating pattern.

Figure 7:
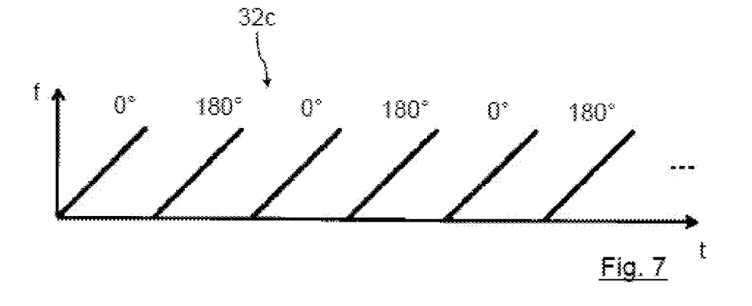
FIG. 7 shows a frequency/time diagram of a third transmission signal of a third transmitter of the radar system from FIGS. 1 to 3.

FIG. 7 shows a frequency/time diagram, comparable with FIGS. 5 and 6, of the third transmission signal 32c. The third transmission signal 32c is emitted on the basis of successive chirps, in a way analogous to the first transmission signal 32a. In this context, the successive chirps are implemented with a phase change, specifically between 0° and 180°, and therefore with a regularly alternating pattern.

The receivers RxA, RxB, RxC and RxD are used to receive the echoes, reflected at the object 18, of the transmission signals 32a, 32b and 32c as received signals 34a, 34b and 34c, and convert them into a form which can be used by the control/evaluation device 28.

The received signals 34a, 34b and 34c are respectively subjected, in combination for all the receivers RxA, RxB, RxC and RxD and individually for each receiver RxA, RxB, RxC and RxD, to a two-dimensional fast Fourier transformation, using corresponding means of the control/evaluation device 28.

Target signals ZS, corresponding to the transmission signals 32a, 32b and 32c, of physically present target objects and their respective complex-valued amplitudes are obtained from the results of the two-dimensional discrete Fourier transformations. A target object is a part of the object 18. A plurality of target objects can originate from the same object 18 or from different objects.

One time signal ZS per target object corresponds to the first transmission signal 32a. Likewise, one target signal ZS per target object corresponds to the third transmission signal 32c. Owing to the shifting of the phase position and of the transmission pauses of the second transmission signal 32b, two target signals ZS per target object correspond after the Fourier transformation. Therefore, a total of four target signals ZS correspond to each target object.

The target signals ZS from the second transmission signal 32b are shifted by half the uniqueness range with respect to one another in the Doppler dimension and by ¼ or ¾ of the uniqueness range with respect to the target signal ZS from the first transmission signal 32a, that is to say with respect to the actual relative speed. The target signal ZS from the third transmission signal 32c is shifted in the Doppler dimension by half the uniqueness range with respect to the target signal ZS from the first transmission signal 32a, that is to say with respect to the actual relative speed.

In addition—if the transmission signals 32a, 32b and 32c are emitted with the same power—for the same target object the complex-valued amplitudes of the target signals ZS from the second transmission signal 32b are identical in respect of absolute value and phase and lower in respect of the absolute value than the complex-valued amplitudes of the target signal ZS from the first transmission signal 32a and of the target signal ZS from the third transmission signal 32c. The complex-valued amplitudes of the target signals ZS from the first transmission signal 32a and the third transmission signal 32c are the same in respect of the absolute value and different in terms of their respective phases.

The two target signals ZS from the same transmission signal 32b have the same phase, that is to say the same complex amplitude value. This makes it possible to use the method according to the invention to detect the second transmission signal 32b unambiguously. With respect to the first transmission signal 32a and the third transmission signal 32c there is ambiguity which is resolved with the method according to the invention.

Figure 8:
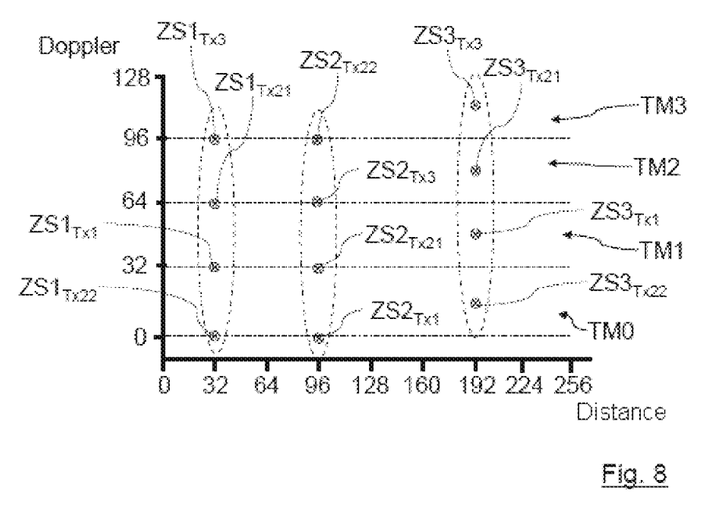
FIG. 8 shows a range Doppler diagram with target signals which have been acquired from received signals of the first transmission signal, of the second transmission signal and of the third transmission signal from FIGS. 5 to 7 which have been reflected at three target objects.

In FIG. 8, for example the target signals ZS are each indicated in a range Doppler matrix with a cross. The range gates correspond here to so-called "range bins" or distance intervals. The range Doppler matrix comprises, for example, 256 range gates. The Doppler gates correspond to what are referred to as relative speed gates or "Doppler bins". In the present exemplary embodiment, the uniqueness range in the Doppler dimension corresponds to the number of chirps and is 128 Doppler gates, as already mentioned above. The range Doppler matrix therefore comprises, for example, 128 range gates. The range Doppler matrix is composed of cells which are characterized by a range value k and a Doppler value l, and has a complex-valued amplitude s(k, l). The absolute value of the amplitude s(k, l) characterizes the intensity of any signal in the cell or, if no signal is received, the noise there.

In the exemplary embodiment shown, the target signals ZS of three target objects are determined by way of example In this context, the target signals ZS which are located at the same range gate with the same range value, that is to say at the same distance from the radar sensor 12, correspond to the same target object.

The assignment of the target signals ZS to the transmission signals 32a, 32b and 32c and to the corresponding target objects occurs first in the manner explained further below. However, for the sake of better comprehension the respective designations will already be introduced at this point. The target signals are designated by "ZS1", "ZS2" and "ZS3", in a corresponding way to the target objects. The target signals ZS which originate from the first transmission signal 32a are additionally characterized by "Tx1". The target signals ZS which correspond to the second transmission signal 32b are additionally designated by "Tx21" or "Tx22", wherein "Tx21" corresponds to the first target signal and "Tx22" corresponds to the second target signal of the second transmission signal 32b. The target signals ZS which originate from the third transmission signal 32c are additionally characterized by "Tx3". For example, the target signal which corresponds to the second target object and originates from the first transmission signal 32a has the designation "$ZS2_{Tx1}$".

Correspondingly, the target signals which correspond to the second target object and originate from the second transmission signal 32b have the designations "$ZS_{Tx21}$" and "$ZS2_{Tx22}$". The target signal which corresponds to the third target object and originates from the first transmission signal 32c has the designation "$ZS2_{Tx3}$".

In FIG. 8, the three target signals ZS which are associated with the same target object are each surrounded with a dotted ellipse to make them easily recognizable. The target signals ZS1 which are associated with the first target object have the same range value, for example 32. In addition, the three target signals ZS1 have the Doppler values 0, 32, 64 and 96. The target signals ZS2 which are associated with the second target object have the same range value, for example 96, and the Doppler values 0, 32, 64 and 96. The target signals ZS3 which are associated with the third target object have the same range value, for example 192, and the Doppler values 16, 48, 80 and 112.

Figure 9:
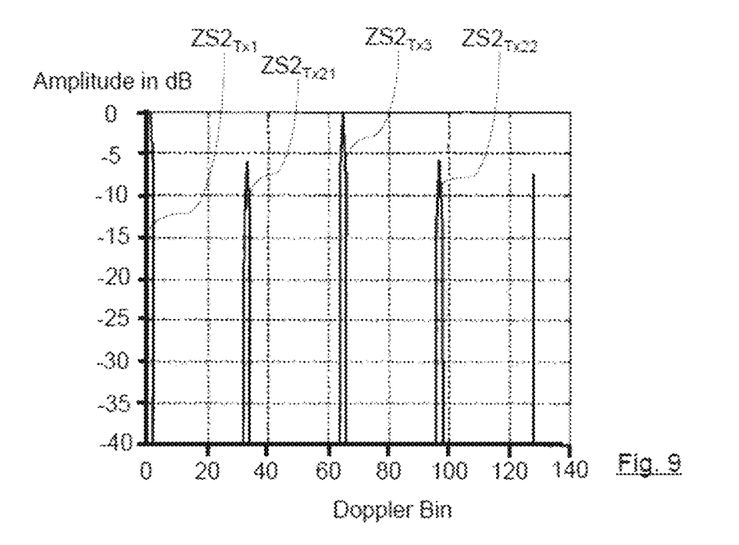
FIG. 9 shows an amplitude absolute-value Doppler diagram of the second target signals from FIG. 8, which are located in the same range gate.

FIG. 9 shows, for example, the target signals $ZS2_{Tx1}$, $ZS2_{Tx21}$, $ZS2_{Tx22}$ and $ZS2_{Tx3}$, which are associated with the second target object, in an amplitude absolute-value Doppler diagram. in the present exemplary embodiment, the relative speed of the second target object with respect to the radar system 12 is equal to 0. For example, the amplitudes are specified in a standardized form in decibels. In the example, the absolute values of the amplitudes of the target signals $ZS2_{Tx21}$ and $ZS2_{Tx22}$ from the second transmission signal 32b are 6 dB lower than the absolute values of the amplitudes of the target signal $ZS2_{Tx1}$ from the first transmission signal 32a and of the target signal $ZS2_{Tx3}$ from the third transmission signal 32c. It is also clear from the FIGS. 8 and 9 that there is a shift symmetry around half the uniqueness range, specifically 64 Doppler bins, in the Doppler dimension.

In the text which follows it is explained how the target signals ZS are assigned to the corresponding transmission signals 32a, 32b and 32c and validated.

The result from the Fourier transformation is used in combination for all the receivers RxA, RxB, RxC and RxD for the assignment of the first transmission signal 32a and of the second transmission signal 32b. For the assignment of the third transmission signal 32c as described below, the respective results from the Fourier transformations are used individually for the corresponding receivers RxA, RxB, RxC or RxD.

The range Doppler matrix is divided into sub-matrices TM0, TM1, TM2 and TM3 with the same extent in the Doppler dimension. In this context, the number of sub-matrices TM is calculated from the quotient of the number of Doppler gates of the uniqueness range and the smallest possible Doppler interval between target signals ZS originating from the first transmission signal 32a, the second transmission signal 32b and the third transmission signal 32c, of the same target object. In the case of the exemplary uniqueness range of 128 Doppler gates and a smallest Doppler interval of 32 Doppler gates, the range Doppler matrix is divided into four sub-matrices TM0, TM1, TM2 and TM3, each with an extent of 32 Doppler gates.

For each range value k the absolute values of the complex-valued amplitudes s of the cells of the sub-matrices TM0, TM1, TM2 and TM3, which each correspond in priority with respect to their Doppler value l are combined to form a respective spectrum value $a_{k,lt}$. In other words, the respective cells of the sub-matrices TM0, TM1, TM2 and TM3 with the lowest Doppler value l are combined, those cells with the second-lowest Doppler value l are combined, those cells with the third-lowest Doppler value l are combined, and those cells with the highest Doppler value l are combined. In order to determine the spectrum values $a_{k,lt}$, the absolute values of the amplitudes s of the respective cells are advantageously added and the result is squared. This is done according to the following formula:

$$a_{k,lt} = (|s(k,lt)| + |s(k,lt+32)| + |s(k,lt+64)| + |s(k,lt+96)|)^2$$

Here, "k" is the respective distance value between 0 and 256. "lt" is a serial parameter for the Doppler values l. "lt" runs from 0 to 32, that is to say over the extent of a sub-matrix TM in the Doppler dimension. s(k,lt) corresponds to the bottom sub-matrix TM0 in FIG. 8, which sub-matrix TM0 extends between the Doppler values 0 and 32. s(k,lt+32) corresponds to the second bottom sub-matrix TM1 in FIG. 8, which sub-matrix TM1 extends between the Doppler values 32 and 64. s(k,lt+64) corresponds to the third sub-matrix TM2 in FIG. 8, which sub-matrix TM2 extends between the Doppler values 64 and 96. s(k,lt+96) corresponds to the top sub-matrix TM3 in FIG. 8, which top sub-matrix TM3 extends between the Doppler values 96 and 128.

Figure 10:
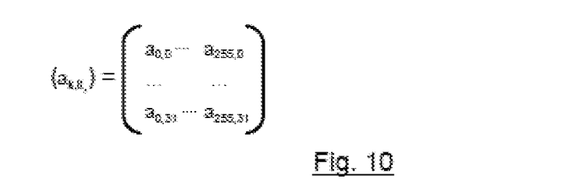
FIG. 10 shows a spectrum matrix which can be acquired from the amplitudes of the cells in accordance with the range Doppler diagram from FIG. 8.

The spectrum values $a_{k,lt}$ obtained in this way can be presented in a 32×256 spectrum matrix $(a_{k,lt})$, as indicated in FIG. 10. In this context, for the sake of better clarity, only four of the spectrum values $a_{k,lt}$ are designated.

Figure 11:
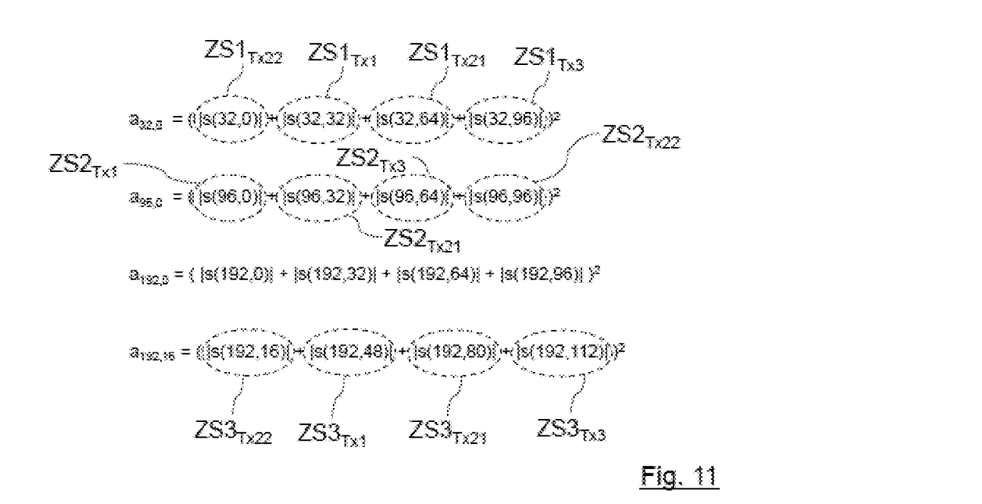
FIG. 11 shows calculations of, for example, four spectrum values of the spectral matrix from FIG. 10.
Figure 12:
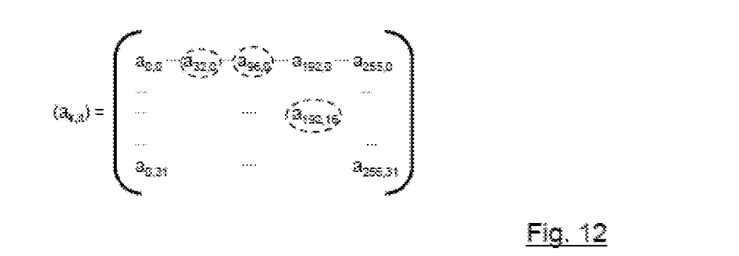
FIG. 12 shows the spectral matrix from FIG. 10, which contains, for example, the spectrum values from the calculations from FIG. 11.

For example, calculations for four of the spectrum values $a_{k,lt}$ are shown in FIG. 11. Anticipating the result, for the sake of simpler explanation, the amplitudes s of cells, in which target signals ZS are located, are surrounded by dotted ellipses and provided with the corresponding designations. The amplitudes s are not marked by ellipses and merely have noise. The corresponding spectrum matrix $(a_{k,lt})$ is illustrated in FIG. 12. For the sake of better clarity, the spectrum values $a_{k,lt}$ which are calculated by way of example and those which have already been illustrated in FIG. 10 are shown here. The spectrum values $a_{k,lt}$ which amplitudes s of cells, in which target signals ZS are located, are surrounded by dotted ellipses to make them more easily recognizable.

From all the spectrum values $a_{k,lt}$, those which are above a predefined threshold and are detected as being target spectrum values which are associated with a respective target signal ZS1, ZS2 and ZS3 are determined, for example, with a detection algorithm for determining a constant false alarm rate (CFAR). In the present example, these are the spectrum values $a_{32,0}$, $a_{96,0}$, and $a_{192,16}$, which, for the sake of better clarity, are designated in the text which follows as target spectrum values $az_{32,0}$, $az_{96,0}$, and $az_{192,16}$.

For each target spectral value $az_{k,lt}$, the complex-valued amplitudes $s_0 = s(k,lt)$, $s_1 = s(k,lt+32)$, $s_2 = s(k,lt+64)$ and $s_3 = s(k,lt+96)$ of the cells which lead to this target spectrum value $az_{k,lt}$ and which have the same range value k are combined in pairs according to the following formulas to form a first comparison value $X_0$ and a second comparison value $X_1$.

$$X_0 = |s_0 - s_2|^2$$

$$X_1 = |s_1 - s_3|^2$$

Here, a difference is formed between the complex-valued amplitude so of the cell which is associated with the respective target spectrum value az and which has the lowest Doppler value l and the complex-valued amplitude $s_2$ of the cell which is associated with the target spectrum value az and has the third-lowest Doppler value l. The absolute value of the difference is squared and assigned to the first comparison value $X_0$. In addition, a difference is formed between the complex-valued amplitude $s_1$ of the cell which is associated with the same target spectrum value az and which has the lowest Doppler value l and the complex-valued amplitude $s_3$ of the cell which is associated with the target spectrum value az and has the highest Doppler value l. The absolute value of the difference is squared and assigned to the second comparison value $X_1$.

In the text which follows, this is carried out by way of example for the second target object with the range value k=32. In the example, the target spectrum value $az_{96,0}$ with the complex-valued amplitudes s(96,0), s(96,32), s(96,64) and s(96,96) corresponds to the second target object. For example, the following correspond:

$$X_{0,Target2} = |s(96,0) - S(96,64)|^2$$

$$X_{1,Target2} = |s(96,32) - s(96,96)|^2$$

By analogy with the Doppler amplitude diagram in FIG. 9, it is assumed that a cell with a target signal $ZS1_{Tx1}$, which originates from the first transmission signal 32a has the same absolute amplitude value $|s(k,1)|$ as a cell with a target signal $ZS1_{Tx3}$, which originates from the third transmission signal 32c, but has a different phase. The cells with the target signals $ZS1_{Tx21}$ and $ZS1_{Tx22}$, which originate from the second transmission signal 32b have, for example, the same complex-valued amplitude with the same absolute amplitude value $|s(k,1)|$ with the same phases. Cells without a target signal, of which none are present in the example of the range value k=32, have, on average, significantly lower absolute amplitude values than cells with a target signal. Cells without a target signal generally only have noise.

The following relationships for the amplitudes are obtained for the second target object:

$$s(96,0) \neq s(96,64)$$

$$s(96,32) = s(96,96)$$

The following is obtained for the comparison values $X_{0,Target2}$ and $X_{1,Target2}$:

$$X_{0,Target2} = |s(96,0) - s(96,64)|^2 > 0$$

$$X_{1,Target2} = |s(96,32) - s(96,96)|^2 = 0$$

The comparison values $X_{0,Target2}$ and $X_{1,Target2}$ are compared. The signals which are associated with the cells from whose amplitudes s the lower of the two comparison values $X_{0,Target2}$ or $X_{1,Target2}$ is formed are validated as the two target signals $ZS_{Tx21}$ and $ZS_{Tx22}$ which originate from the second transmission signal 32b, for the same target object.

In the example, the lower comparison value is $X_{1,Target2}$. The comparison value $X_{1,Target2}$ was formed from the amplitudes $s_1(96,32)$ and $s_3(96,96)$. Therefore, the signals which are associated with the cells (96, 32) and (96, 96) of the range Doppler matrix are validated as the two target signals $ZS2_{Tx21}$ and $ZS2_{Tx22}$ of the second target object from the second transmission signal 32b.

The amplitudes $s_0(96,0)$ and $s_2(96,64)$, which are associated with the higher comparison value $X_{0,Target2}$ are assigned below:

For this purpose, as already explained above, the results of the Fourier transformations are used individually for each receiver RxA, RxB, RxC and RxD.

A difference between the phase of the complex-valued amplitude $s(96,0)_{RxD}$ and the phase, for example, of the complex-valued amplitude $s(96,32)_{RxA}$ is formed. The absolute value of this difference is assigned to a third comparison value $Y_{0,Target2}$ In addition, a difference between the phase of the other of the complex-valued amplitudes $s(96,64)_{RxD}$ and the phase of the complex-valued amplitude $s(96,32)_{RxA}$ is formed. The absolute value of this difference is assigned to a fourth comparison value $Y_{1,Target2}$ Correspondingly, for example:

$$Y_{0,Target2} = |\text{Phase}(s(96,0)_{RxD}) - \text{Phase}(s(96,32)_{RxA})|$$

$$Y_{1,Target2} = |\text{Phase}(s(96,64)_{RxD}) - \text{Phase}(s(96,32)_{RxA})|$$

Here, the complex-valued amplitude $s(96,0)_{RxD}$ of the transmission signal received with the receiver RxD is used. The second transmission signal 32b, received by the receiver RxD, of the second transmitter Tx2 is not used to form the double-assigned virtual element 2A/3D. The complex-valued amplitude $s(96,0)_{RxD}$ corresponds in priority to the amplitude $s(96,0)$ in the combined consideration of the receivers RxA, RxB, RxC, RxD, for which the higher of the first two comparison values, for example $X_{0,Target2}$, is formed.

In addition, the other complex-valued amplitude $s(96,64)_{RxD}$ of the transmission signal received with the receiver Rx is used. The other complex-valued amplitude $s_2(96,64)_{RxD}$ corresponds in priority to the other of the two amplitudes $s_2(96,64)$ in the combined consideration of the receivers RxA, RxB, RxC, RxD, from which the higher of the first two comparison values, for example $X_{0,Target2}$, is formed.

The complex-valued amplitude $s_1(96,32)_{RxA}$ is received with the receiver RxA. The receiver RxA leads to the double-assigned virtual element 2A/3D, in which the second transmitter Tx2 is involved. Instead of the complex-valued amplitude $s(96,32)_{RxA}$, the complex-valued amplitude $s(96,96)_{RxA}$ or a mean value of the complex-valued amplitude $s(96,32)_{RxA}$ and the complex-valued amplitude $s(96,96)_{RxA}$ can also be used.

The third comparison value $Y_{0,Target2}$ and the fourth comparison value $Y_{1,Target2}$ are compared. The signal which is associated with the cells from whose amplitude $s_0(96,0)_{RxD}$ or $s_2(96,64)_{RxD}$ the lower of the two comparison values $Y_{0,Target2}$ or $Y_{1,Target2}$ is formed is validated as the target signal $ZS2_{Tx3}$ for the same target object 18 which originates from the third transmission signal 32c. The signal which is associated with the cells from whose amplitude $s_0(96,0)_{RxD}$ or $s_2(96,64)_{RxD}$ the higher of the two comparison values $Y_{0,Target2}$ or $Y_{1,Target2}$ is formed is validated as the target signal $ZS2_{Tx1}$ for the same target object 18 which originates from the first transmission signal 32a.

In the exemplary embodiment, the amplitude $s_0(96,0)_{RxD}$ for the target signal $ZS2_{Tx1}$ from the first transmission signal 32a and the amplitude $s_2(96,64)_{RxD}$ for the target signal $ZS2_{Tx3}$ from the third transmission signal 32c are validated. This validation applies correspondingly to the combination of the receivers RxA, RxB, RxC and RxD.

Object information of the second target object, for example a speed and a distance of the object relative to the radar system 12 is obtained from the validated target signals $ZS2_{Tx1}$, $ZS2_{Tx21}$, $ZS2_{Tx22}$ and $ZS2_{Tx3}$, from the combination of the receivers RxA, RxB, RxC and RxD. For this purpose, for example the complex-valued amplitudes which correspond to the virtual elements of the virtual array 36 at the same vertical height, specifically 1A, 1B, 1C, 1D, 3A, 3B, 3C, 2A/3D, 2B, 2C, and 2D, are processed, in a way which is not of interest here, by means of a digital beam forming algorithm.

Since the first transmission signal 32a is not encoded and is not shifted in its phase, the Doppler value 1 which is associated with the first target signal 38a can be considered to be the correct Doppler value, and the correct distance and relative speed of the second target object can be derived therefrom.

The method steps which are explained by way of example on the basis of the second target object are correspondingly carried out for the first target object and the third target object. In this way, the corresponding target signals $ZS1_{Tx1}$, $ZS1_{Tx21}$, $ZS1_{Tx22}$ and $ZS1_{Tx3}$ or respectively $ZS3_{Tx1}$, $ZS3_{Tx21}$, $ZS3_{Tx22}$ and $ZS3_{Tx3}$ are also validated for the other target objects, and the corresponding object information is determined therefrom.

The entire method is carried out cyclically, with the result that the monitoring range 14 is monitored continuously for objects 18, and correspondingly sensed objects 18 can be tracked.

Figure 13:
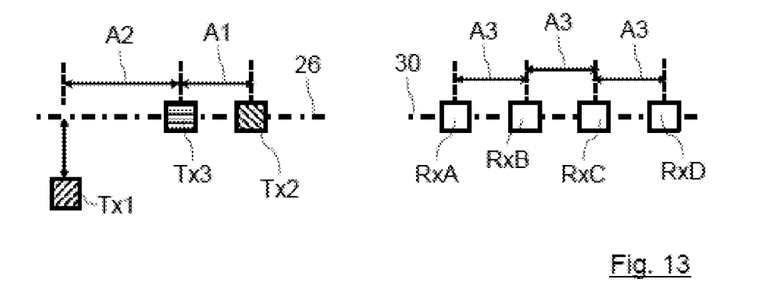
FIG. 13 shows a front view of the transmitters and receivers of a radar system according to a second exemplary embodiment, which is similar to the radar system from FIGS. 1 and 2.
Figure 14:
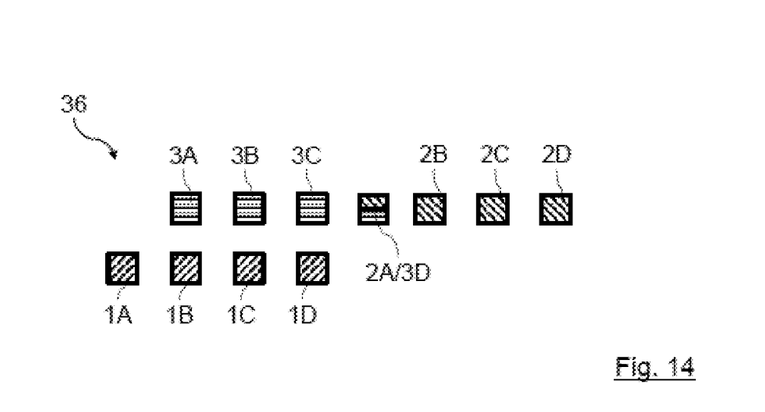
FIG. 14 shows a virtual array which arises from the transmitters and receivers of the radar system from FIG. 13 after geometric folding.

FIGS. 13 and 14 show an arrangement of transmitters and receivers according to a second exemplary embodiment. FIG. 13 shows here the spatial arrangement of the three transmitters Tx1, Tx2, and Tx3 and of the four receivers RxA, RxB, RxC and RxD. In contrast to the first exemplary embodiment from FIGS. 1 to 12, in the second exemplary embodiment the first transmitter Tx1 is arranged next to the transmitter line 26, offset downwards in a normal orientation of the radar system 12. The second distance A2 from the third transmitter Tx3 in a projection onto the transmitter line 26 corresponds to half the wavelength of the first transmission signal 32a.

FIG. 14 shows the corresponding virtual array 36. Owing to the offset of the first transmitter Tx1, the corresponding virtual elements 1A, 1B, 1C and 1D in the virtual array 36 are also offset downwards. As a result of the shortening of the distance A2 in comparison with the first exemplary embodiment, the virtual element 1B is arranged under the virtual element 3A, the virtual element 1C is arranged under the virtual element 3B, and the virtual element 1D is arranged under the virtual element 3C.

In an exemplary embodiment which is not shown, the second distance A2 can alternatively be selected in such a way that, in a projection onto the transmitter line 26, it corresponds to twice or three times half the wavelength of the first transmission signal 32a. In this case, the number of virtual elements which can be used to determine the elevation is reduced.

In the second exemplary embodiment, the validation of the transmission signals 32a, 32b and 32c is carried out in a way analogous to the first exemplary embodiment.

For the determination of the azimuth angle, the complex amplitude values which are associated with the virtual elements 3A, 3B, 3C, 2A/3D, 2B, 2C and 2D at the same height are processed, in a way analogous to the first exemplary embodiment, by means of a digital beam forming algorithm.

For the determination of the elevation, a phase difference between the amplitudes of the validated target signals which are associated with the virtual elements which are respectively arranged one above the other in the virtual array 36 is determined.

Phase difference (3A−1B)
Phase difference (3B−1C)
Phase difference (3C−1D)

These phase differences can, for example, be converted directly into an elevation angle by using an assignment table which is determined by means of measurements.

Alternatively or additionally, averaging of the three phase differences designated above can firstly be carried out and then the conversion into the elevation angle can take place.

The invention claimed is:

1. A method for determining at least one object information item of at least one target object which is sensed with a radar system of a vehicle, the method comprising:
   transmitting transmission signals into a monitoring range of the radar system with at least three transmitters;
   receiving echoes reflected at the at least one target object, of the transmission signals, as received signals with at least two receivers, wherein the received signals are converted into a form useable by an electronic control and/or evaluation device;
   subjecting the received signals to at least one discrete Fourier transformation;
   determining at least one target signal from the result of the at least one Fourier transformation;
   determining at least one object information item from the at least one target signal;
   generating, at the transmitter end, at least one first transmission signal, at least one second transmission signal, and at least one third transmission signal from a frequency-modulated continuous wave signal,
   wherein the at least one second transmission signal and the at least one third transmission signal are encoded by phase modulations with respect to each other and with respect to the at least one first transmission signal, with the result that at least temporary signal orthogonality is brought about between the transmission signals,
   wherein the at least one first transmission signal is transmitted with at least one first transmitter, and the at least one second transmission signal is transmitted with at least one second transmitter, and the at least one third transmission signal is transmitted with at least one third transmitter simultaneously into the monitoring range of the radar system, wherein the at least one second transmission signal is emitted with regular transmission pauses of a predefined length, and
   wherein the received signals are subjected to at least one multi-dimensional discrete Fourier transformation, and
   wherein at the receiver end, a plurality of target signals is determined both for all the receivers and individually for each receiver, from the result of the at least one multi-dimensional discrete Fourier transformation,
   wherein, for each physically present target object, one of the target signals corresponds to the at least one first transmission signal, two of the target signals correspond to the at least one second transmission signal, and one of the target signals corresponds to the at least one third transmission signal.

2. The method according to claim 1, wherein the at least one third transmitter and the at least one second transmitter are arranged along a virtual transmitter line, wherein the transmitter line runs transversely with respect to the main transmission directions of the transmitters.

3. The method according to claim 2, wherein the at least one third transmitter is arranged at a first distance from the at least one second transmitter, wherein the first distance is specified as an integral multiple, in particular multiplication by three, of half the wavelength of the at least one first transmission signal.

4. The method according to claim 2, wherein the at least one first transmitter is arranged on the virtual transmitter line or the at least one first transmitter is arranged next to the virtual transmitter line.

5. The method according to claim 2, wherein the at least one first transmitter and the at least one second transmitter are arranged, considered in a projection onto the transmitter line, at different distances from the at least one third transmitter.

6. The method according to claim 1, wherein the at least two receivers are arranged on a virtual receiver line, wherein the receiver line runs transversely with respect to the main reception directions of the receivers, and wherein the adjacent receivers are each arranged at a distance from one another, which corresponds to half the wavelength of the at least one first transmission signal.

7. The method according to claim 1, wherein the result of the at least one multi-dimensional Fourier transformation is respectively implemented in combination for all the receivers and individually for each receiver as a range Doppler matrix for a uniqueness range with respect to a Doppler dimension, wherein the range Doppler matrix is composed of cells which are each characterized by a Doppler value and a range value and have a complex-valued amplitude which characterizes a signal intensity,
   the range Doppler matrix is divided into four sub-matrices with the same extent with respect to the Doppler dimension,
   for each range value, the absolute values of the amplitudes of the cells of the sub-matrices, which each correspond in priority with respect to their Doppler value, are combined to form a respective spectrum value,
   from the spectrum values, those values are determined which are above a predefined threshold and are detected as target spectrum values which are associated with a respective target signal.

8. The method according to claim 7, wherein for at least one target spectrum value from the combination of all the receivers
   a difference between the complex-valued amplitudes of the cells which are associated with this target spectrum value and have the lowest Doppler value and the third-lowest Doppler value is formed, and the absolute value of this difference is squared and assigned to a first comparison value,
   and a difference between the complex-valued amplitudes of the cells which are associated with this target spectrum value and have the second-lowest Doppler value and the highest Doppler value is formed, and the absolute value of this difference is squared and assigned to a second comparison value,
   the first comparison value and the second comparison value are compared and the signals which are associated with the cells from whose amplitudes the lower of the two comparison values is formed are validated as the two target signals which originate from the at least one second transmission signal, for the same target object.

9. The method according to claim 8,
   starting from a preceding spatial arrangement of the transmitters and of the receivers geometric folding or geometric projection is carried out, and a virtual array is generated therefrom, and that element of the virtual array is identified as a double-assigned virtual element to which both at least one received signal of the at least one second transmission signal which is received by at least one of the receivers is applied, and at least one received signal of one of the two other respective at least one transmission signals which is received by at least one other of the receivers is applied, a difference is formed between the phase of one of the complex-valued amplitudes of that receiver which does not use the second transmission signal of the second transmitter-to form the double-assigned virtual element, wherein this complex-valued amplitude corresponds in priority to one of the two amplitudes from which the higher of the first two comparison values is formed, in the combined consideration of the receivers, and the phase of one complex-valued amplitude or the mean value of the two complex-valued amplitudes, of that receiver which leads to the double-assigned virtual element in which the second transmitter is involved and the absolute value of this difference is assigned to a third comparison value, and a difference is formed between the phase of the other of the complex-valued amplitudes-of that receiver which does not use the second transmission signal of the second transmitter to form the double-assigned virtual element, wherein this other complex-valued amplitude corresponds in priority to the other of the two amplitudes in the combined consideration of the receivers, from which amplitudes the higher of the first two comparison values is formed, and the phase of one complex-valued amplitude or the mean value of the two complex-valued amplitudes, of that receiver which leads to the double-assigned virtual element in which the second transmitter is involved and the absolute value of this difference is assigned to a fourth comparison value, the third comparison value and the fourth comparison value are compared, and the signal which is associated with the cells from whose amplitudes the lower of the two comparison values is formed is validated as the target signal for the same target object which originates from the at least one third transmission signal, and the signal which is associated with the cells from whose amplitudes the higher of the two comparison values is formed is validated as the target signal for the same target object which originates from the at least one first transmission signal.

10. The method according to claim 1, wherein the length of the transmission pauses of the at least one second transmission signal is predefined as a chirp duration or an integral multiple of the chirp duration of the at least one first transmission signal.

11. The method according to claim 1, wherein in the course of the determination of at least one object information item, a phase difference between at least two target signals is determined and/or a digital beam forming algorithm is carried out.

12. The method according to claim 1, wherein a phase change between 0° and 180° is applied to at least one transmission signal after each frequency ramp of the frequency-modulated continuous wave signal.

13. A radar system of a vehicle, for determining at least one object information item of at least one target object, the radar system comprising:
at least three transmitters for transmitting transmission signals into a monitoring range;
at least two receivers for receiving echoes, which are reflected at the at least one target object, of the transmission signals as received signals; and
at least one control and/or evaluation device,
wherein the at least one control and/or evaluation device has means for determining at least one object information item from at least one target signal,
the at least one control and/or evaluation unit comprises means for carrying out the method according to claim 1.

14. The radar system according to claim 13, wherein two of the transmitters are arranged at a distance from one another which corresponds to an integral multiple by three of half the wavelength of one of the transmission signals.

15. A driver assistance system of a vehicle, comprising:
at least one electronic control device for controlling functional devices of the vehicle on the basis of object information which is made available by at least one radar system; and
at least one radar system according to claim 14.

* * * * *